United States Patent
Ivashin et al.

(10) Patent No.: US 7,634,540 B2
(45) Date of Patent: Dec. 15, 2009

(54) PRESENTER VIEW CONTROL SYSTEM AND METHOD

(75) Inventors: Victor Ivashin, Danville, CA (US); Jamie C. Rasmussen, Mountain View, CA (US); Steve Nelson, San Jose, CA (US)

(73) Assignee: Seiko Epson Corporation, Tokyo (JP)

( * ) Notice: Subject to any disclaimer, the term of this patent is extended or adjusted under 35 U.S.C. 154(b) by 547 days.

(21) Appl. No.: 11/549,058

(22) Filed: Oct. 12, 2006

(65) Prior Publication Data

US 2008/0091778 A1 Apr. 17, 2008

(51) Int. Cl.
*G06F 15/16* (2006.01)

(52) U.S. Cl. ............ 709/204; 709/203; 709/205; 715/751; 715/762; 715/788; 715/828; 348/14.01; 348/14.03; 348/14.08

(58) Field of Classification Search ........... 709/204; 348/14.01, 14.03, 14.08
See application file for complete search history.

(56) References Cited

U.S. PATENT DOCUMENTS

| | | | |
|---|---|---|---|
| 5,541,852 | A | 7/1996 | Eyuboglu et al. |
| 5,657,096 | A | 8/1997 | Lukacs |
| 5,657,246 | A | 8/1997 | Hogan et al. |
| 5,737,011 | A | 4/1998 | Lukacs |
| 5,745,161 | A | 4/1998 | Ito |
| 5,757,920 | A | 5/1998 | Misra et al. |
| 5,764,277 | A | 6/1998 | Loui et al. |
| 5,828,838 | A | 10/1998 | Downs et al. |
| 5,872,922 | A | 2/1999 | Hogan et al. |
| 5,875,296 | A | 2/1999 | Shi et al. |
| 5,896,128 | A | 4/1999 | Boyer |
| 5,963,547 | A | 10/1999 | O'Neil et al. |
| 5,991,276 | A | 11/1999 | Yamamoto |
| 6,006,253 | A | 12/1999 | Kumar et al. |
| 6,067,623 | A | 5/2000 | Blakely, III et al. |
| 6,075,571 | A | 6/2000 | Kuthyar et al. |
| 6,195,091 | B1 | 2/2001 | Harple et al. |
| 6,202,084 | B1 | 3/2001 | Kumar et al. |
| 6,212,206 | B1 | 4/2001 | Ketcham |
| 6,233,341 | B1 | 5/2001 | Riggins |
| 6,243,129 | B1 | 6/2001 | Deierling |

(Continued)

FOREIGN PATENT DOCUMENTS

CA 2234085 10/1999

(Continued)

OTHER PUBLICATIONS

M. H. Willebeek-Lemair, Z.-Y., Shae, "Centralized versus Distributed Schemes for Videoconferencing", Proceedings of the 5th IEEE Workshop on Future Trends of Distributed Computing Systems, (FTDCS 95').

(Continued)

*Primary Examiner*—Yves Dalencourt (57) ABSTRACT

In a method for providing partial layout synchronization in a teleconferencing system, a conference client application enters a presenter participant mode and accepts a layout modification from a local user. The layout modification alters a selection or arrangement of conference components in a user interface. The conference client determines whether the layout modification is a significant layout modification or an insignificant layout modification and transmits a command to a conference server containing a representation of the layout modification only when the layout modification is a significant layout modification.

16 Claims, 8 Drawing Sheets

U.S. PATENT DOCUMENTS

| | | |
|---|---|---|
| 6,285,661 B1 | 9/2001 | Zhu et al. |
| 6,288,739 B1 | 9/2001 | Hales et al. |
| 6,292,225 B1 | 9/2001 | Champion et al. |
| 6,292,834 B1 | 9/2001 | Ravi et al. |
| 6,310,857 B1 | 10/2001 | Duffield et al. |
| 6,313,822 B1 | 11/2001 | McKay et al. |
| 6,356,313 B1 | 3/2002 | Champion et al. |
| 6,377,282 B1 | 4/2002 | Champion |
| 6,384,862 B1 | 5/2002 | Brusewitz et al. |
| 6,405,111 B2 | 6/2002 | Rogers et al. |
| 6,519,662 B2 | 2/2003 | Clapp et al. |
| 6,560,516 B1 | 5/2003 | Baird et al. |
| 6,564,128 B2 | 5/2003 | Baird et al. |
| 6,583,806 B2 | 6/2003 | Ludwig et al. |
| 6,701,372 B2 | 3/2004 | Yano et al. |
| 6,728,884 B1 | 4/2004 | Lim |
| 6,760,749 B1 | 7/2004 | Dunlap et al. |
| 6,775,782 B1 | 8/2004 | Buros et al. |
| 6,785,810 B1 | 8/2004 | Lirov et al. |
| 6,819,752 B2 | 11/2004 | Raniere et al. |
| 6,823,452 B1 | 11/2004 | Doyle et al. |
| 6,956,878 B1 | 10/2005 | Trisnadi ............ 372/27 |
| 6,961,754 B2 | 11/2005 | Christopoulos et al. |
| 6,989,856 B2 | 1/2006 | Firestone et al. |
| 2001/0043571 A1 | 11/2001 | Jang et al. |
| 2002/0064136 A1 | 5/2002 | O'Neil |
| 2002/0080280 A1 | 6/2002 | Champion et al. |
| 2002/0156910 A1 | 10/2002 | Senda |
| 2002/0169961 A1 | 11/2002 | Giles et al. |
| 2003/0016630 A1 | 1/2003 | Vega-Garcia et al. |
| 2003/0023848 A1 | 1/2003 | Wray |
| 2003/0037158 A1 | 2/2003 | Yano et al. |
| 2003/0074674 A1 | 4/2003 | Magliaro |
| 2003/0117486 A1 | 6/2003 | Ferren et al. |
| 2003/0123464 A1 | 7/2003 | Lee et al. |
| 2003/0149802 A1 | 8/2003 | Curry et al. |
| 2004/0015981 A1 | 1/2004 | Coker et al. |
| 2004/0047290 A1 | 3/2004 | Komandur et al. |
| 2004/0078478 A1 | 4/2004 | Yahagi |
| 2004/0133846 A1 | 7/2004 | Khoshatefeh et al. |
| 2004/0172656 A1 | 9/2004 | Kim et al. |
| 2004/0243805 A1 | 12/2004 | Enokida |
| 2005/0099492 A1* | 5/2005 | Orr .................... 348/14.08 |
| 2005/0198123 A1 | 9/2005 | Nagayama et al. |

FOREIGN PATENT DOCUMENTS

| | | |
|---|---|---|
| WO | WO9510157 | 4/1995 |
| WO | WO9946651 | 9/1999 |

OTHER PUBLICATIONS

"How Terminal Server Advanced Client Connect to a Terminal Server Computer", from Microsoft.com web site, Dec. 10, 2004.

* cited by examiner

PRESENTER VIEW CONTROL SYSTEM AND METHOD

CROSS REFERENCE TO RELATED APPLICATIONS

This application is related to U.S. patent application Ser. No. 10/192,130 filed on Jul. 10, 2002 and entitled "Method and Apparatus for Controllable Conference Content via Back-Channel Video Interface;", which is now abandoned; U.S. patent application Ser. No. 10/192,080 filed on Jul. 10, 2002 and entitled "Multi-Participant Conference System with Controllable Content Delivery Using a Client Monitor Back-Channel;" which is now U.S. Pat. No. 7,362,349; U.S. patent application Ser. No. 10/952,053 filed on Sep. 28, 2004 and entitled "Video Conference Choreographer;" which is now U.S. Pat. No. 7,499,075; U.S. patent application Ser. No. 10/853,698 filed on May 25, 2004 and entitled, "Local Video Loopback Method for a Multi-Participant Conference System Using a Back-Channel Video Interface;" which is now U.S. Pat. No. 7,176,957; U.S. patent application Ser. No. 11/051,674 filed on Feb. 4, 2005 and entitled "Adaptive Bit-Rate Adjustment of Multimedia Communications Channels Using Transport Control Protocol;" which is still pending; U.S. patent application Ser. No. 11/199,600 filed on Aug. 9, 2005 and entitled "Client-Server Interface to Push Messages to the Client Browser;" which is still pending; and U.S. patent application Ser. No. 11/340,062 filed on Jan. 25, 2006 and entitled "IMX Session Control and Authentication;" which is now U.S. Pat. No. 7,581,244; all of which are incorporated herein by reference.

BACKGROUND

Participants of electronic conferencing systems exchange audio, video and other media though interaction with various device interfaces. These devices may employ simple interfaces for handling a small set of media types, or may offer complex interfaces for simultaneous display of large sets of media types. The conferencing systems have been challenged to exchange an ever wider range of media among meeting participants. Core media signals like audio and video are typically supported naturally by these systems. However, the exchange of documents, images, shared web-pages or desktop views, movies, alternate video streams, and other media typically demand more extensive user interfaces to allow meeting participants to manage the content and visual appearance.

During the course of an ordinary live conference, the primary activity of its participants may change. For example, the initial focus may be viewing a set of slides shared by one participant. After the slides have been viewed, the focus may switch to video group discussion or a question and answer session. Whiteboard drawing interaction may become necessary to further the meeting. To accommodate this range of interactivity in an online meeting, it is necessary to reallocate system resources when the primary activity or focus of the meeting changes. For example, if the slides are the current focus of the meeting then most screen space can be reserved for their display. Operations that affect slide communication may be enabled. Concurrent video may appear in a smaller region (or not at all), and its frame rate can fall to allow more network resources to transmit slide information among the participants. When group discussion becomes the focus of a meeting, a much larger amount of screen space may be reserved for video of the speaking participants, and a greater portion of the available bandwidth can be used for the video data stream.

User interfaces may be developed to accommodate a variety of activities in a teleconference. Separate windows can show conference video, display documents, or even provide shared drawing surfaces. Some interfaces host a set of tools that the user can manipulate to manually reconfigure the application for each conference purpose. However, such manual modification of a workspace layout, bandwidth allocation, and other configurable parameters distracts from the focus of the meeting as it becomes tedious and time-consuming. The result is an interrupted flow of meeting communication.

Some existing teleconference systems are therefore built to limit the types of media supported in an effort to reduce the media management complexity. They might provide simple fixed interfaces for certain media types or just limit participant interaction with the media to reduce interface management duties and keep distractions away from the flow of the communication. Other systems require that primary participants wishing to present media learn a complex set of new interfaces to notify listening participants of a particular media they should focus on. Other systems require an allocated meeting controller, sometimes referred to as a "moderator," whose role is to press interface buttons that direct the media and discussion on behalf of a presenter participant. Sometimes, the only method is to communicate with the listening participants verbally or otherwise to instruct the participating members how to manipulate their teleconference device interfaces directly for display of the media desiring presentation. In all cases, the goal is to get all attending members "on the same page" so the meeting communication can continue.

What is required is a teleconferencing interface that allows a wide range of media support, yet provides simplified and automatic propagation of a presenter's chosen view to all attending participants in a meeting so that his conference media of interest is identified clearly as the meeting focus. This system also needs to be flexible enough to not unduly restrict a participant's use of the system while still maintaining control of the meeting flow by the presenter.

SUMMARY

Broadly speaking, the present invention fills these needs by providing a presenter view control system and method that naturally enhances the flow and control of a meeting by a presenter in a teleconferencing system.

It should be appreciated that the present invention can be implemented in numerous ways, including as a process, an apparatus, a system, a device, or a method. Several inventive embodiments of the present invention are described below.

In one embodiment, a method for providing partial layout synchronization in a teleconferencing system is provided. In the method, a conference client application enters a presenter participant mode and accepts a layout modification from a local user, e.g., by manipulating user-interface elements of the conference client. The layout modification alters a selection or arrangement of conference components in a user interface. The conference client determines whether the layout modification is a significant layout modification or an insignificant layout modification and transmits a command to a conference server containing a representation of the layout modification only when the layout modification is a significant layout modification.

In another embodiment a teleconferencing system for providing partial layout synchronization is provided. The system includes a conference server comprising a general purpose computer system and a plurality of conference clients. Each conference client communicates with the conference server over a network connection, the conference server thereby effectuating communication between and among the plurality of conference clients. The conference server is configured to designate one conference participant attending a teleconference using the teleconferencing system as a presenter-participant. The presenter-participant being a local user of one conference client of the plurality of conference clients. The one conference client is configured to enter a presenter mode in response to the designation. The one conference client is further configured to accept a layout modification from the local user, the layout modification altering a selection or arrangement of conference components in a user interface. The conference client, when in the presenter mode, is further configured to determine whether the layout modification is a significant layout modification or an insignificant layout modification, and to transmit a command to the conference server containing a representation of the layout modification only when the layout modification is a significant layout modification. The conference server is configured to broadcast the command to another of the plurality of conference clients.

In yet another embodiment, a method for configuring a user interface is provided. The method includes receiving a representation of a layout for the user interface and constructing the user interface in a display area from the representation. The representation of the layout selection is contained in a string, the string defining a cell for each displayed component. Each cell being defined in the string as a left, right, top, or bottom portion of a larger region in which the cell is contained, the cell further occupying a defined fraction of space of the larger region.

The advantages of the present invention will become apparent from the following detailed description, taken in conjunction with the accompanying drawings, illustrating by way of example the principles of the invention.

BRIEF DESCRIPTION OF THE DRAWINGS

The present invention will be readily understood by the following detailed description in conjunction with the accompanying drawings, and like reference numerals designate like structural elements.

DETAILED DESCRIPTION

In the following description, numerous specific details are set forth in order to provide a thorough understanding of the present invention. However, it will be apparent to one skilled in the art that the present invention may be practiced without some of these specific details. In other instances, well known process operations and implementation details have not been described in detail in order to avoid unnecessarily obscuring the invention. The terms, "teleconference" and "conference," as used hereinbelow, are interchangeable.

Figure 1:
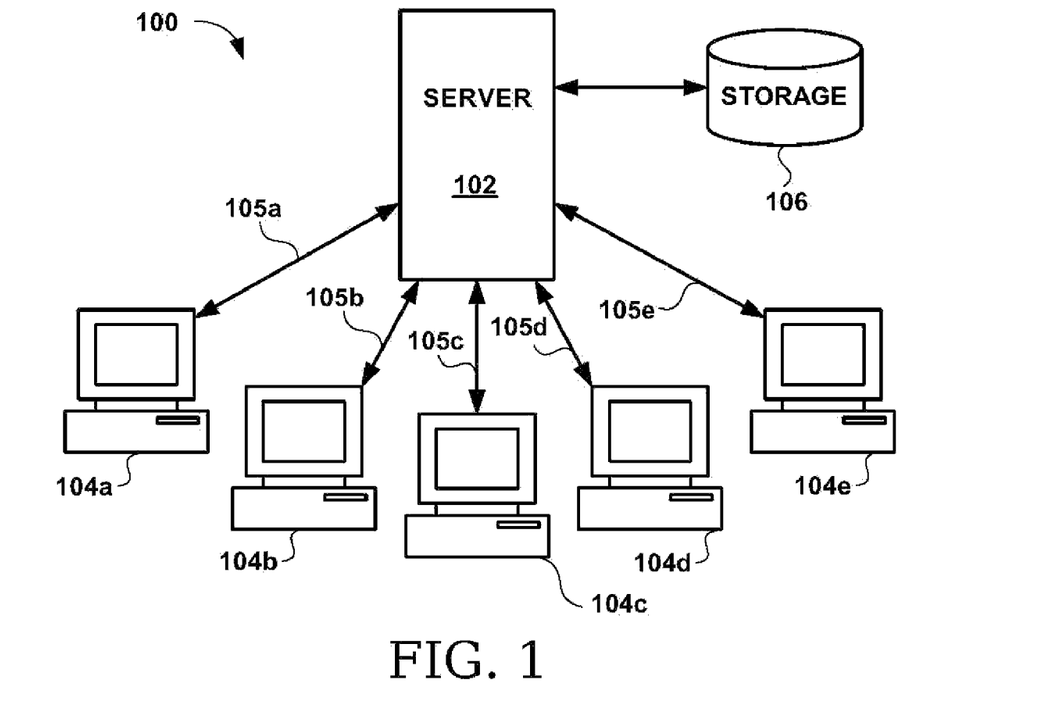
FIG. 1 is a schematic diagram presenting an overview of an exemplary teleconferencing system.

FIG. 1 is a schematic diagram presenting an overview of an exemplary teleconferencing system 100. Teleconferencing system 100 includes a conference server 102 and a plurality of conference clients 104a-104e. In one embodiment, conference server 102 is a general purpose computer system as described in more detail below with reference to FIG. 2. Each network connection 105a-105e may be a local area network (LAN) connection or a wide area network (WAN) connection, such as an Internet connection. Storage 106 may be connected to a local bus of server 102, or may be accessible over a network connection as in network attached storage (NAS) systems or other external storage systems. Conference server 102 runs teleconference server software which is stored in the memory system and runs on the central processing unit (CPU). In addition, conference server 102 may store meeting media and related persistent meeting information while facilitating media exchange among all participants. In one embodiment, conference server 102 is a dedicated server that primarily runs the teleconference server software to implement teleconferences. In another embodiment, conference server 102 is not dedicated to conference serving, but can be used to run other software for performing other tasks besides running the teleconference server software.

Each conference client 104a-104e may also be a general purpose computer as described in more detail below with reference to FIG. 2. Each conference client 104a-104e executes teleconference client software to place each conference participant using one of conference clients 104a-104e in communication with the other conference participants. Although teleconferencing system 100 includes five conference clients 104a-104e, any number of conference clients may be connected to server 102, although the number of conference clients may be limited by the processing power and bandwidth available to server 102.

In one exemplary operation, each conference client 104a-104e establishes a network connection 105a-105e to conference server 102. Over this network connection, each conference client is able to transmit video and audio streams, along with other data being shared by the participant using that conference client. The video and audio streams are encoded by the teleconference client software, packetized into network packets, and transmitted to the server 102 along with other media being shared over the corresponding network connection. Conference server 102 receives the audio streams from each conference client and mixes them to form a mixed audio stream. In addition, the conference server receives the video streams from each conference client, decodes the video streams, generates individual composite video streams according to the preferences for each conference client, and encodes and compresses the individual composite video streams. The compositing process may require resizing of videos received from the conference clients. Conference server 102 then transmits the individual composite video streams along with the mixed audio stream to each conference client. In addition, control commands and shared media flow through conference server 102 so that newly arriving conference participants can easily obtain the state of the conference session and any media being shared.

In this way, each conference client receives, from the conference server, a mixed audio stream containing audio information from other conference clients and a composite video stream according to the preferences and video layout selections made by the individual conference client. The conference client then decodes the mixed audio stream and generates audible sound according to the mixed audio stream allowing the conference participant to hear the voices of the other participants. In addition, the conference client decodes the personalized composite video signal and displays the video on the local display. In this way, the local participant can see any number of selected conference participants in a chosen layout, e.g., with video signal from a primary speaker occupying a majority of the video image size, with smaller video image space given to other speakers, as selected by the local participant.

In addition to audio and video information, other information may be communicated between participants. For example, a shared whiteboard space may be provided allowing participants to contribute and share ideas in a pictorial manner by drawing onto the whiteboard using a mouse or other pointing device. In addition, there may be an instant message window allowing participants to send each other instant messages without disrupting the teleconference proceedings. In addition, there may be a shared desktop or document area wherein participants can share their desktop to share content provided by a software application stored locally on the conference client. For a detailed description of exemplary interfaces, protocols, and communications between conference participants in the exemplary system, reference may be made to co-pending U.S. Patent Applications incorporated herein by reference, and particularly, U.S. patent applications Ser. Nos. 10/192,130; 10/192,080; 10/952,053; and 10/853,689.

In one embodiment, any meeting participant can request-identification as a presenter participant. Only one presenter participant can be identified at a time. While identified as the presenter participant, he or she may easily control the selection and layout of conference components of the teleconference as presented to other meeting members, e.g., for the purpose of targeting focus on a particular media set of interest as determined by that presenter participant. The presenter participant simply utilizes the existing interface for local user interface layout modification, as the interface to select and configure a local user interface layout does not change when the user is designated as the presenter, except for a visual notification of presenter status. Other participants are free to engage with the targeted view, or they may utilize their user interface for other purposes and can easily return to the preferred presenter view as desired. In various embodiments described below with reference to FIGS. 7A-11, procedures are provided for defining or changing a local user interface layout, propagating a layout selection or partial layout change, and operating associated user interface presenter controls.

Figure 2:
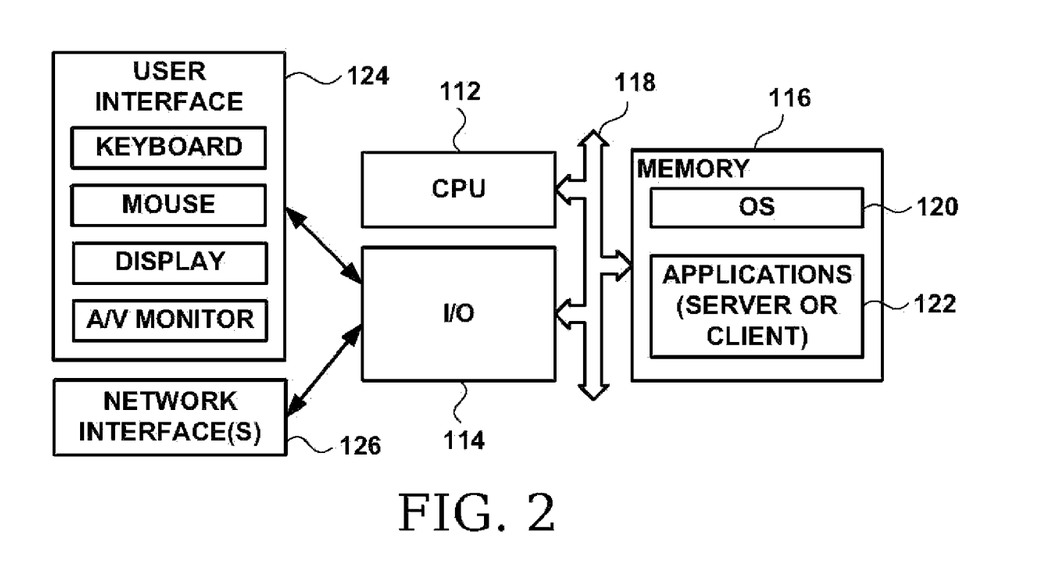
FIG. 2 shows an exemplary multipurpose computer system that can be used with the teleconferencing of FIG. 1.

FIG. 2 shows an exemplary multipurpose computer system 110 that can be used with the teleconferencing system 100 described above with reference to FIG. 1. Computer system 110 includes a plurality of components, some of which may not be required depending on the implementation and whether computer system 110 is being used as a server or a client. Specifically, computer system 110 includes a central processing unit (CPU) 112 which may include one or more processors each of which may include one or more processing cores. CPU 112 may also include various other components known to those skilled in the art such as one or more cache memories and data handling logic.

CPU 112 is in communication with I/O ports 114 and memory 116 over bus 118. Memory 116 stores data (not shown), operating system (OS) 120 and application software 112. Application software 112 may include conference server software and/or conference client software. When a conference server software is executed on computer system 110, computer system 110 may be referred to as a "conference server" and when conference client software is executed on computer system 110, computer system 110 may be referred to as a "conference client." As mentioned above with reference to FIG. 1, memory 116 may include multiple memories such as primary and secondary memories. Primary memory may be local random access memory and secondary memory may include one or more mass storage devices, such as a hard disk drive. Secondary memory may include network attached storage (NAS) wherein data is accessible over a network connection.

I/O ports 114 permit computer system 110 to connect to an external network as well as place computer system 110 in communication with a local user, also referred to herein as a conference participant, using user interface 124.

In one exemplary embodiment, user interface 124 includes a keyboard, mouse, display, and audio/video (A/V) monitoring devices such as a video camera and microphone. Of course, other user interface devices may be appropriate, depending on the implementation. The keyboard and mouse provides a means allowing the user to provide input into the computer system, e.g., to give commands by manipulating user interface objects represented on the display. Other devices (not shown), such as speech recognition software, touch sensitive screens or tablets, handwriting recognition, etc., that provides this functionality are also contemplated.

Network interface 126 provides a communication path between computer system 110 and a local area network. In one embodiment, network interface 126 comprises a network interface card (NIC), and allows computer system 110 to communicate via a local area network to a wide area network such as the Internet, via a gateway attached to the local area network. Any number of network interfaces may be connected to computer system 110 and each network interface may be capable of maintaining a plurality of network connections.

Figure 3:
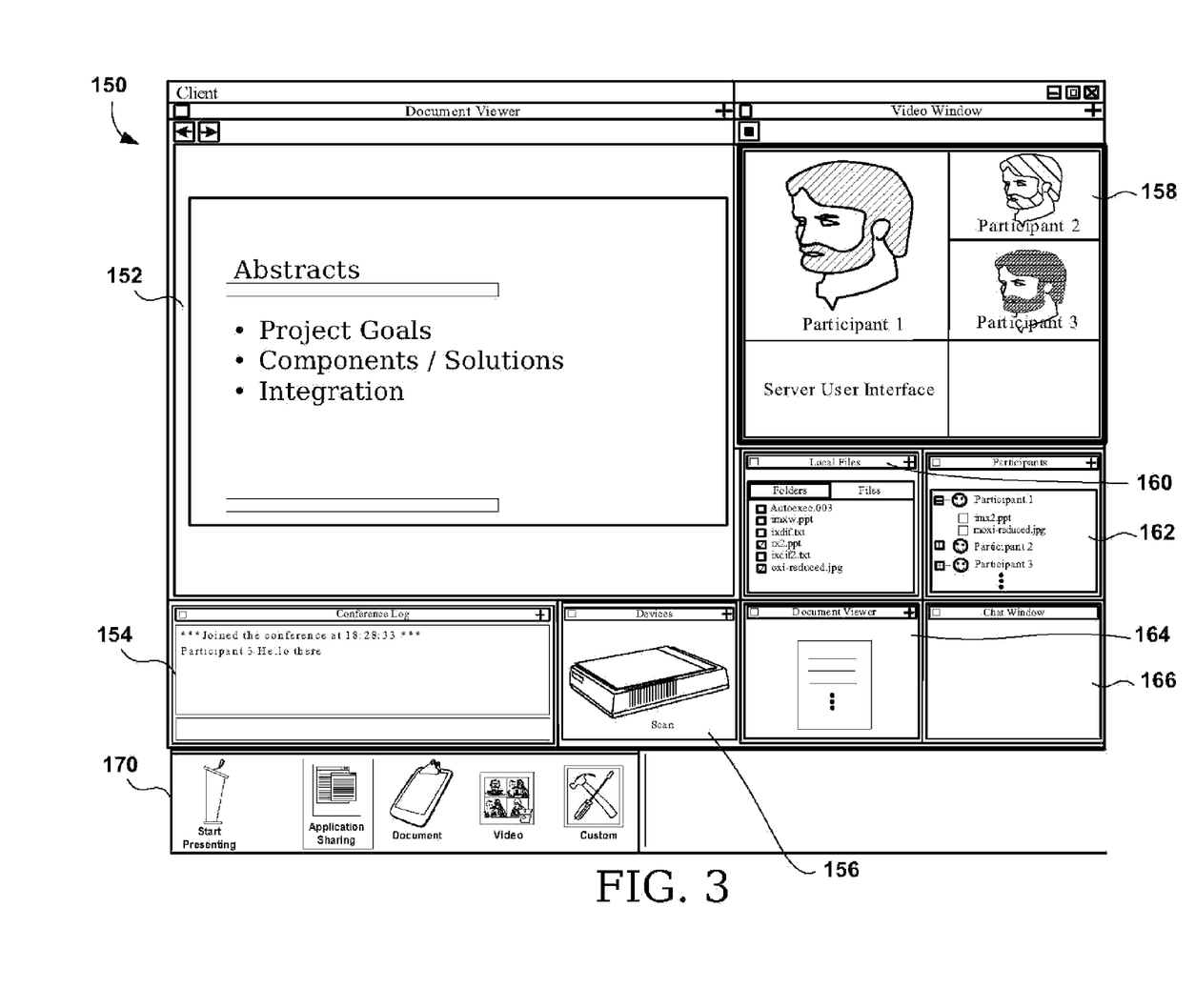
FIG. 3 shows an exemplary conference application interface for presenting video, shared documents, and other information to a conference participant.

FIG. 3 shows an exemplary conference application interface 150 for presenting video, shared documents, and other information to the conference participant. Conference application interface 150 includes a plurality of components 152-166, each covering a rectangular region of conference application interface 150. In one embodiment, components 152-166 are not permitted to overlap each other as in traditional windowing systems. Each component, or a set of components, is optionally selected by the user to be displayed and can be relocated and resized as described, for example, in related U.S. patent applications Ser. Nos. 10/192,130 and 10/192,080, which are incorporated herein by reference. Each component presents a view and/or interface relating to some aspect of the conference data. In the example shown, component 152 is a document view that in this example is showing some slides, e.g., from a slide presentation software such as Microsoft® PowerPoint®; component 154 is displaying a conference log; component 156 provides a device interface for sharing media from attached devices; component 158 displays a composite video showing video streams from other participants; component 160 provides an interface to select local files for sharing; component 162 provides a list of files being shared by participants; component 164 shows an additional document, e.g., a word processing document; and component 166 presents a chat window for sending instant messages to other participants. It should be recognized that other components may be made available to the local participant for display, and that the local participant can control which components are displayed, their position, and relative sizes. In addition to the various components described above, a control bar 170 provides access to commonly used functions by a single mouse click, as will be described in further detail below with reference to FIGS. 7A-7C.

Figure 4:
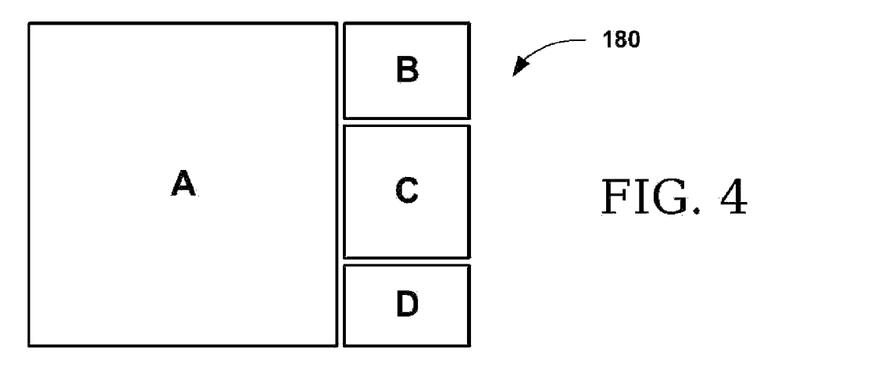
FIGS. 4, 5A, 5B, and 5C illustrate an exemplary mechanism by which a video display area may be divided to present a plurality of cells as exemplified in FIG. 3.
Figure 5A:
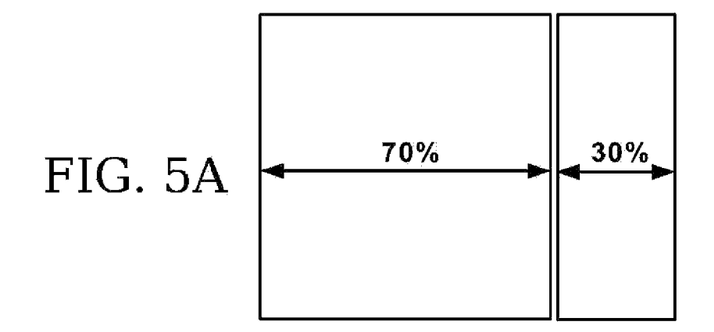
Figure 5B:
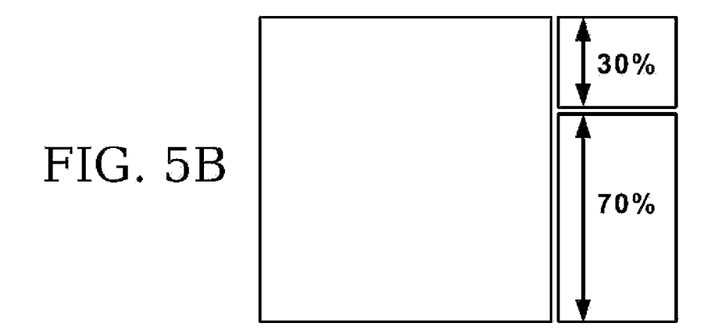
Figure 5C:
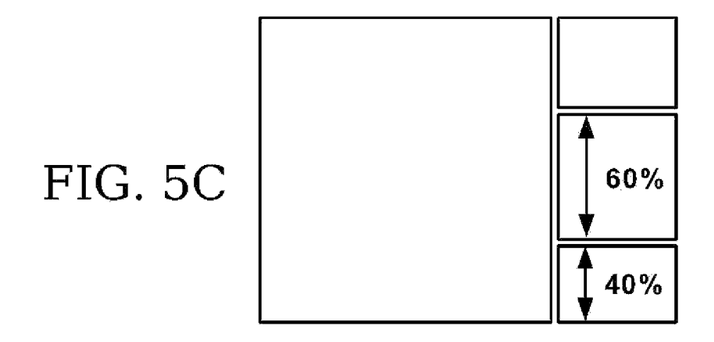

FIGS. 4-5C illustrate an exemplary mechanism by which a video display area may be divided to present a plurality of cells as exemplified in FIG. 3. FIG. 4 shows a display area 180 divided into four cells A, B, C, and D. Each cell may be assigned to a selected component. In one embodiment, the layout of the cells is determined based on recursively dividing a resizable application window region of the screen. The divisions are logically made using a percentage of the available space within the window, rather than an absolute measure such as pixels or inches. This method accommodates variable window sizes and screen resolutions which may vary from one conference client to another. As the application window size changes, the sizes of the components assigned to each cell within the application window correspondingly changes, and the layout representation remains unchanged.

FIG. 4 shows an example view layout that can be described by (1) dividing the available rectangular vertically, so that the left region is 70% of the rectangle's available width and the right region is 30% of the available width as shown in FIG. 5A; (2) dividing the right region from the previous step horizontally, so that the top region is 30% of the rectangle's available height and the bottom region is 70% of the available height as shown in FIG. 5B; and (3) dividing the bottom region from the previous step horizontally, so that the top region is 60% of that rectangle's available height and the bottom region is 40% of the available height as shown in FIG. 5C. In one embodiment, the layout is defined by recording, for each division, the orientation of the division, i.e., either vertical or horizontal, and the percentage of available space reserved for the left or top subdivision.

Figure 6:
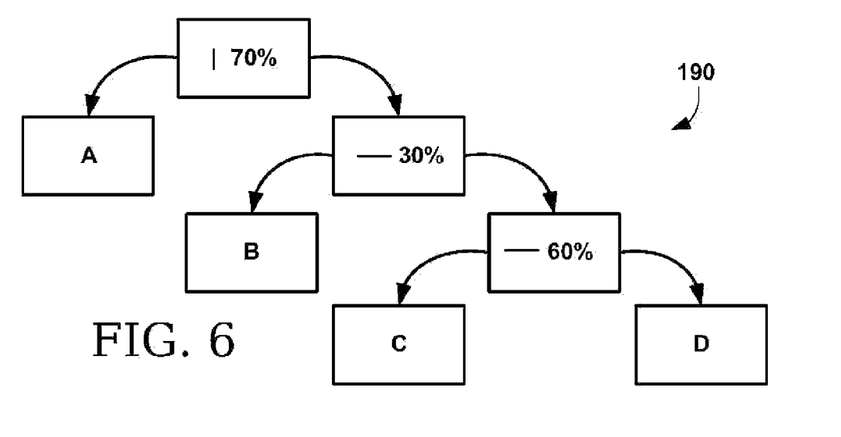
FIG. 6 shows a binary tree that contains sufficient information to define the layout of FIG. 4.

FIG. 6 shows a binary tree 190 that contains sufficient information to define the layout of FIG. 4. In the binary tree, a leaf node represents a layout cell, and a non-leaf node represents a division between cells. It should be understood that other data structures could be used to represent the cell layout, such as an N-ary tree. Since this representation is immune to global scale changes, the entire interface can be resized to fit any display screen or windowed space of a display screen.

The layout information contained in binary tree 190 can be converted into a string value according to a predefined syntax, and convert such a well-formed string value back into a binary tree representation. In one embodiment, a cell (leaf node) may be represented by taking the identifier of the component it contains, and surrounding it with square brackets. For example, component B is represented by "[B]". A division (non-leaf node) may be represented by a matching pair of parentheses surrounding four pieces of information: a character representing vertical or horizontal division, e.g., "|" or "-", respectively, and an integer representing the percentage of the available space to give the top or left child (in this example, expressed as a portion of 1000), followed by the string representing the left subtree and the string representing the right subtree. Spaces may be added between each piece to simplify parsing and make the representation human-readable. Table 1 shows an exemplary construction of such a string. In this construction, the tags <left> and <right> are used as place-holders for regions that are to be assigned a component such as [A] or [B], or else subdivided.

TABLE 1

| | |
|---|---|
| (| 700 <left><right>) | As shown in FIG. 5A |
| (| 700 [A] (−300 <left><right>)) | As shown in FIG. 5B |
| (| 700 [A] (−300 [B] (−600 <left><right>))) | As shown in FIG. 5C |
| (| 700 [A] (−300 [B] (−600 [C] [D]))) | As shown in FIG. 4 |

Although this example only subdivides the right (or bottom) portion of each division, it should be recognized that the left or top portion can similarly be subdivided, so that the layout shown in FIG. 3 could be achieved. For example, the layout in FIG. 3 could be represented as the string value, "(|650(−750[Document Viewer](|700[Conference Log][Devices]))(−550[Video Window](−500(|500[Local Files][Participants])(|500[Document Viewer][Chat Window]))))". This syntax for a string representation of a given layout is relatively compact and easy for a computer program to parse. For example, since parentheses are matched, the end of a layout string can easily be determined from its starting position within a larger string. There are of course many other ways of representing the layout as a string, and the present invention is not limited to a specific syntax.

Having multiple representations of the layout information means that a particular layout manipulation can be implemented as an operation on any representation, and converting between representations as needed. For example, one can select a representation that is easy and efficient to send across a computer network, such as the string representation described above, or a representation that can be easily and quickly manipulated in memory, such as the binary tree representation described above with reference to FIG. 6.

Figure 7A:
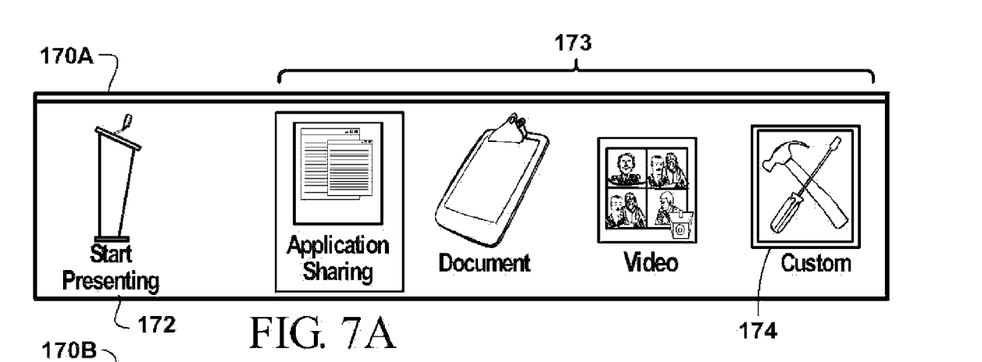
FIGS. 7A, 7B, and 7C show an exemplary control bar in a first, second, and third configuration, selectable based on the status of the local user as a presenter participant and whether another participant is designated as a presenter.

FIG. 7A shows an exemplary control bar 170A in a first configuration that may be displayed when the conference client is in a no-presenter mode, which is entered into when no participant is currently designated to be the presenter participant. In this configuration, "Start Presenting" button 172 is provided to allow the local participant to request presenter participant status. Layout selection buttons 173 allow the local user to select a predefined layout with a single mouse click. Each layout may focus on a specific primary component of focus and reduce the size and required bandwidth of other components. For example, layout selection buttons 173 may include an application sharing layout button, a document sharing button, and a video button, to place the main focus on a shared application, a document, or the video, respectively. Layout selection buttons 173 may include any number of additional custom layout selection buttons 174 (only one shown) to provide access to one or more user-defined layouts.

When the "Start Presenting" button 172 is selected, a request to present is transmitted to conference server 102 (FIG. 1). Upon receiving this request, the conference server might grant presenter status to the participant or reject the request. In one embodiment, rejection occurs when multiple requests are received from different participants. The conference server would assess the request priority or order of the multiple requests and grant one participant the presenter status while rejecting the others. Rejection, of course, may also occur if the meeting does not allow presenters, or the requesting participant is not allowed to become a presenter due to server configurable user access rights, or other reasons.

Figure 7B:
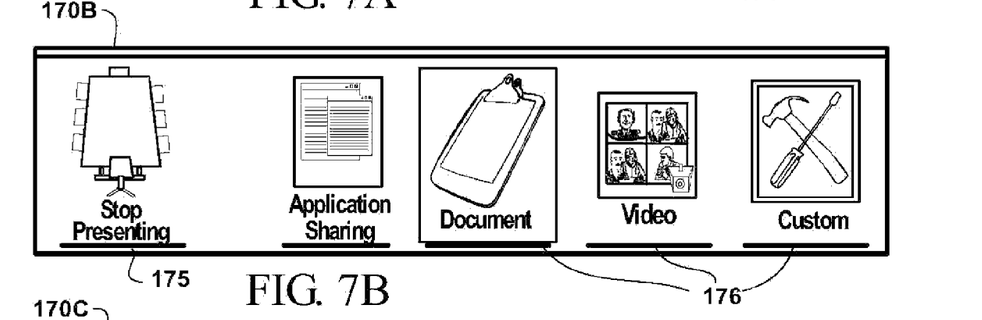
Figure 7C:
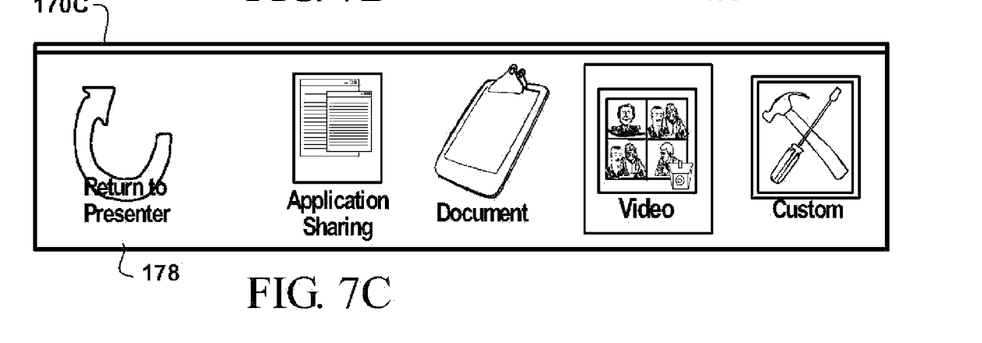

When a participant is granted presenter status, he is called the presenter participant and all other meeting members are informed of his new status. When a participant is given presenter status, the conference client being acted on by the participant enters a presenter mode. FIG. 7B shows an exemplary control bar configuration 170B in presenter mode that is displayed to the presenter participant, and FIG. 7C shows an exemplary control bar configuration 170C in a non-presenter mode that is displayed to non-presenter participants when one of the other participants has presenter status. Thus, the interface changes so that the "Start Presenting" button is unavailable, either replaced with another button or graphically dimmed or otherwise modified to indicate that it is unavailable. For the presenter participant, a "Stop Presenting" button 175 is made available to request that presenter status be relinquished by the local participant. In addition, there may be provided some visual cue, such as a brightly colored bar 176 on each button of control bar 170B, or other graphical indicator to inform the user that they are now a presenter participant and the conference client is in presenter mode. For the non-presenter participant, a "Return to Presenter" button 178 is made available for purposes as will be described in more detail hereinafter, and in particular with reference to FIG. 11.

Referring briefly to FIG. 1, a bidirectional connection channel exists between each conference client 104a-104e and the conference server 102. In certain embodiments, data sent over the channel is structured into individual commands. Commands are uniquely identified and the data that will be packaged in a command is predefined and known to both the client and the server. In one embodiment, the Server has authenticated the sender of each command, so it knows which participant a particular command came from, even if that information is not repeated inside the command. For efficiency, a numeric identifier is used for "on-the-wire" command encoding, but the identifier is also aliased to a string representation for clarity, which will be used for the purposes of this description. Commands can be propagated in various ways. For example, a command might be sent only from the server to one client, or from a client to the server, or a command may be broadcast from the server to all clients, or to all clients except the originating client. The following exemplary commands may be used to communicate presenter status information and layout information:

CmdPresenterChangeReq(partID)—This command is sent to the conference server by a participant identified by partID as a request to obtain presenter status. By setting the partID field to "−1" this command can also be sent by a participant wishing to relinquish presenter status. When the server receives this command, the server changes the active presenter as appropriate and then sends a CmdPresenterChangeAck reply to appropriate participant(s).

CmdPresenterChangeAck(returnCode, partID)—This command is sent in reply to a CmdPresenterStatusReq command. The returnCode parameter is used to identify whether the request is accepted or denied. For example, a returnCode of "0" may indicate that presenter partID is active, a returnCode of "1" may indicate that no presenter is active, a returnCode of "2" may indicate that the request is denied because a presenter is already active, and a return code of "3" could indicate that the request is denied because the requester cannot be a presenter, e.g., because of a restriction made by the conference owner. CmdPresenterChangeAck may also be sent to newly arrived participants to identify whether a presenter is active, and if so, who. If a presenter leaves a meeting, the presenter status changes to none and all remaining participants receive this command. In one embodiment, the conference owner, which could be the person who created the conference or someone designated by the creator, will have presenter status by default, until she leaves the meeting or releases presenter status.

CmdSetView(viewId, viewStyle, viewLayout)—This command may be sent by a presenter client to the server to be broadcast to all other participants and informs the participants of a meeting view change. The viewId field identifies a particular predefined view as may be selected by the presenter participant. The viewStyle field can specify a specific version of the layout identified by the viewId field. For example, some individuals may prefer to have a primary component on the left side of the screen and secondary components on the right. Thus, a viewStyle can specify, e.g., a left handed or right handed configuration. The string value viewLayout identifies a specific component layout as described above with respect to FIGS. 4-6. In addition, the viewLayout field may pass additional workspace attribute information appended to the view string in the form, "{attr=val1,attr2=val2 . . . }". When the presenter participant changes the meeting view, e.g., by selecting a predefined layout or custom-defined layout view, this command is passed from the presenter participant to the conference server, and then to the other participant. In addition, the conference server saves the field values and sends the command to newly arriving participants if there is an active presenter-participant.

CmdSetWorkspaceCell(componentOrder,attributes)—This command is sent by a presenter client to the conference server to be broadcast to all other participants. The field componentOrder presents an ordered comma separated list of layout string identifiers. In one embodiment, the list is tokenized by enclosing them within brackets. The first identifier specifies the primary workspace cell, the second specifies the secondary workspace cell, etc. The field, attributes, provides a comma separated list of workspace attributes, e.g., "{attr=val1,attr2=val2 . . .}". This command provides a mechanism for partial presenter synchronization, whereby non-presenter clients may be given partial layout modifications that, e.g., affect the primary component without affecting non-primary components in their layout. It is also possible to use this command structure to affect secondary, tertiary, etc., components by specifying them in the componentOrder field. In certain embodiments, the command CmdSetView always overrides the previous CmdSetWorkspaceCell command, so that if a server receives a CmdSetView command, its cached CmdSetWorkspaceCell command will be cleared.

Once a presenter participant is designated, partial synchronization of the workspace layout of all non-presenter participants is enforced. The term, "synchronization" refers to non-presenter view layouts being synchronized or modified to match the presenter's layouts. "Partial synchronization" means that some layout changes made by the presenter are reflected in the non-presenter's workspace while others are not. In certain embodiments, partial synchronization is enforced because full synchronization is not always desired. For example, presenter participant {A} may be talking and giving a slideshow. At the same time, non-presenter participants {D} and {E} may be using the Chat component between themselves. For example, {D} may have missed a remark made by {A} and does not want to interrupt everyone by asking that the remark be repeated. Since the presenter is not using the Chat component at that time, she may close it to maximize the screen space for other components. If the layouts are all synchronized, this will unintentionally interrupt the conversation between {D} and {E} as their Chat components close, and will likely cause confusion.

A similar problem occurs when a component user interface varies from user to user. For example, when the Application Sharing component shows a list of applications that can be shared to a sharing participant, but only shows applications actually being shared to the receiving participants. Since changing the application being shared happens relatively infrequently, the participant sharing may want to temporarily enlarge another component in his view, e.g., Video. If the sharing participant is also the presenter participant, this can have the unwanted effect of making everyone else's Application Sharing component too small, and the Video component too large. These problems and others are addressed by the partial synchronization mechanism herein described.

Whenever the presenter participant clicks a layout selection buttons 173 (FIG. 7A) in control bar 170 (FIG. 3, 7A-7C), a CmdSetView is sent to server 102 (FIG. 1). Server 102 stores the most recent copy of that command in persistent storage 106 and forwards the command to all of the non-presenter participants' conference clients. When a conference client 104 (FIG. 1) receives this command, it changes to the view specified by the viewId and viewStyle parameters accompanying the command. Since each client knows the layout corresponding to a particular predefined layout selection enumerated into a viewId code and viewStyle parameter, the viewLayout parameter is redundant for non-custom views, and may be omitted. In one embodiment, the viewLayout string for the predefined views is nevertheless always sent to simplify processing. For example, the string representation for the workspace layout makes identifying the end of the layout string straightforward, and everything after that can be considered to be a list of attributes. Workspace attributes may include such things as the video size shown or other ancillary information.

The presenter participant can modify their workspace in a multitude of ways aside from making selections of pre-defined layouts presented in control bar 170. For example, the presenter participant can open and close components, swap components, relocate or resize components, etc. Any time one of these operations is about to be performed, the presenter's client determines which component is the primary component, and makes the same calculation at the conclusion of the modification. In one embodiment, the determination as to which component is the primary component can be made, for example, by examining the size of the cell it lives in. For example, the largest cell can be deemed to contain the primary component. In another embodiment, the primary component is determined based on a position of the layout. For example, in an exemplary left-handed view style, the component in the upper left corner is considered to be the primary component. In yet another embodiment, the primary component is determined based on an operation mode or view. For example, if a user selects to provide a full screen view of one of the components, e.g., the video component, with an inset for a document, then the full screen view can be identified as the primary component.

If the primary cell has changed, the presenter's client sends the server a CmdSetWorkspaceCell command. The server stores the most recent copy of that command in storage 106 and forwards the command to all non-presenter participants' clients. The command includes two fields. The first holds an ordered comma-separated list of layout string component identifiers, for example, "[doc],[video],[chat]". The second field can be used to specify updates to workspace attributes. For example, a workspace attribute such as "small" "medium" and "large" can be used to specify bandwidth usage. Thus, a functionality change can be made in support of an activity (in addition to a user interface change) that may need to be synchronized with the presenter. When a conference client receives this command, any specified attributes are applied to the local client. For example, if the command specifies the component in the presenter's primary cell, then that component is swapped into the non-presenter's primary cell. In this way, the presenter can shepherd the focus of other participants to a component of primary importance, while minimizing the interruption to their use of other components in the application.

Figure 8:
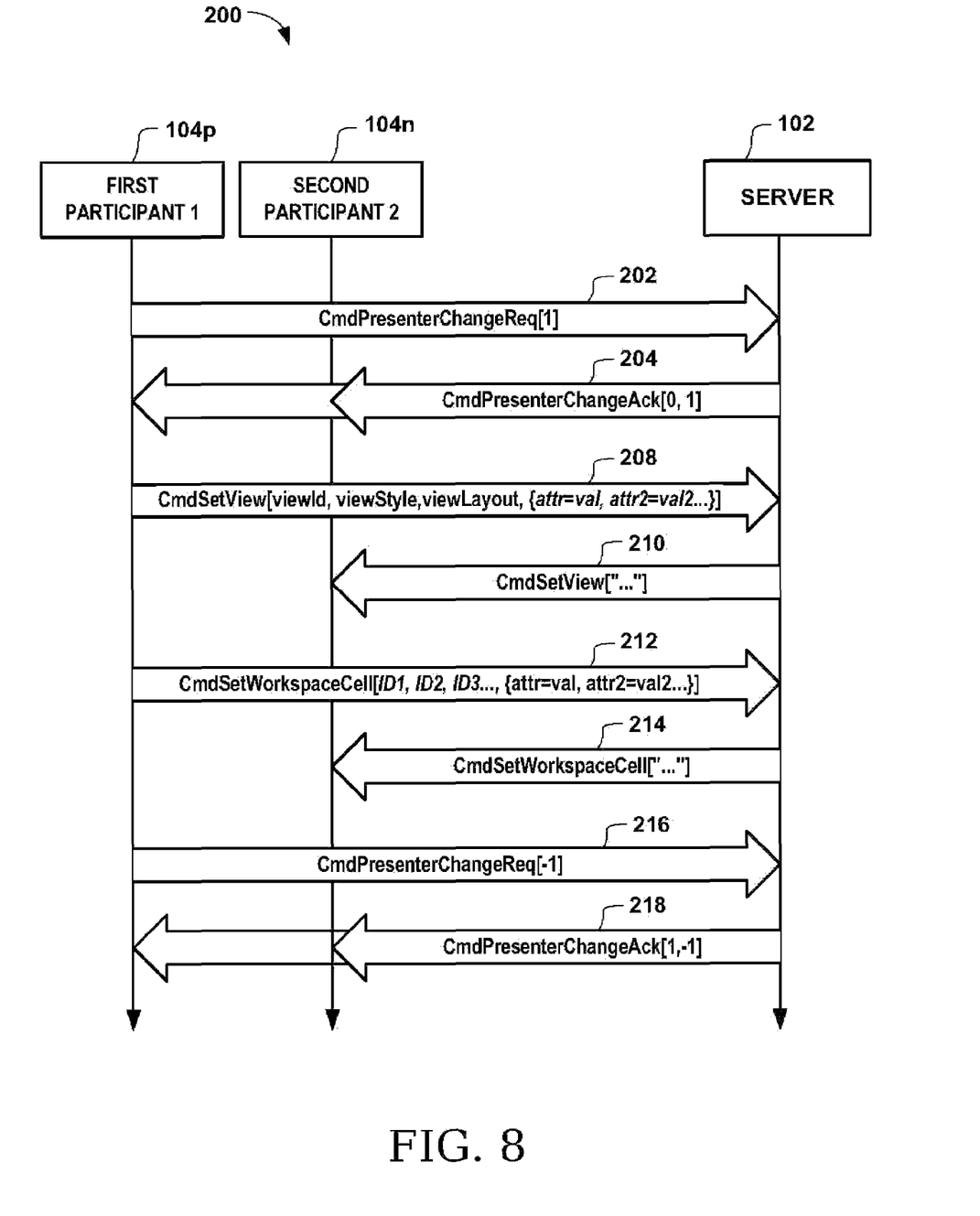
FIG. 8 shows a swim-lane diagram that depicts exemplary transactions between a presenter participant, a non-presenter participant, and a conference server.

FIG. 8 shows a swim-lane diagram 200 that depicts exemplary transactions between a first participant 104p, a second participant 104n, and a conference server 102. At an initial time when no participant is designated as a presenter, first participant 104p sends a request to present by sending a CmdPresenterChangeReq command 202 to conference server 102. In one embodiment, each client is assigned a unique positive integer for identification, however, individual string values may also be used. For exemplary purposes, first participant 104p designates itself by its identifier "1" in the field code transmitted with the command 202. Conference server 102 responds with a CmdPresenterChangeAck command 204 which is sent to the requesting participant. The field code "0" indicates that there is a presenter participant designated and the participant identifier "1" designates who the presenter participant is. Command 204 is sent to first participant 104p to indicate that the request has been granted. In addition, command 204 is sent to all non-presenter participants, including second presenter 104n, to inform them that first participant 104p is now a presenter. On receiving CmdPresenterChangeAck command 204, first participant 104p enters a presenter mode and second participant 104n enters a non-presenter mode.

In one embodiment, first participant 104p transmits a CmdSetView command 208 along with parameters viewId, viewStyle, and viewLayout as described previously to server 102 automatically when designated as a presenter. This command defines a new layout according to the presenter's layout by providing a viewLayout string as described above with reference to FIGS. 4-6. Server 102 receives this command and stores the parameters, then transmits the CmdSetView command 210 to all non-presenter participants, such as second participant 104n, so that the non-presenter participants can synchronize their layouts to the layout selected by first participant 104p. In a different embodiment, the CmdSetView command 208 is only sent when first participant 104p selects a layout command to transform the layout of the interface. For example, the presenter participant may select a pre-defined layout button 173 from control bar 170 (FIGS. 7A-7C) causing the CmdSetView command 208 to be transmitted.

The CmdSetWorkspaceCell command 212 is transmitted from first participant 104p when the presenter modifies her layout in a significant way, e.g., such as when the primary component is changed such that a different component is made the new primary component. The determination of which component is the primary component can be based, for example, on the relative sizes or positions of the components. In one embodiment, ordering is determined by screen area in a custom view, but is predefined in the predefined views. Thus, in a predefined view such as an application sharing view, the components have a predefined ordering which doesn't necessarily correlate to the current size of the component on the screen. It is possible to consider changes to any one of a number of components when determining that a significant change occurred. For example, the system may consider layout cells numbered 1-N, where N might be hard coded or configurable. If N is equal to 3, then primary, secondary, and tertiary cells are checked for modification. If any of them are changed so that they now hold different components, then a significant change is considered to have occurred.

It should be noted that the user may make substantial changes to the user interface configuration or style, e.g., by changing from a windowed mode to a full screen mode, perhaps having a picture-in-picture for a selected component, and these changes may or may not be considered "significant" depending upon the implementation. In one embodiment, user interface style changes are not communicated to the server, even if the primary component is substantially modified as a result. The predefined ordering of predefined views may be used to determine which component is presented using the full screen size when entering full screen mode and which component is placed picture-in-picture. For example, the video component may be designated as the secondary component in all of the non-video predefined views, so that it will appear in the picture-in-picture window in the full screen mode, regardless of how large the video is relative to other components in the view in the normal windowed mode. The CmdSetWorkspaceCell command reflects partial modification by defining the changed component and attributes. Server 102 receives this command and stores the string, then transmits the CmdSetWorkspaceCell command 214 to all non-presenter participants, such as second participant 104n, so that the non-presenter clients can partially modify the layout, e.g., so that the primary component is changed to be the same as the presenter's primary component.

When first participant 104p wishes to relinquish presenter status, she sends a CmdPresenterChangeReq command 216 to server 102 with the value, "−1" to indicate a request to relinquish. The server 102 then responds with an acknowledgement CmdPresenterChangeAck command 218 indicating that no presenter is currently designated. This command is transmitted to all participants.

Figure 9:
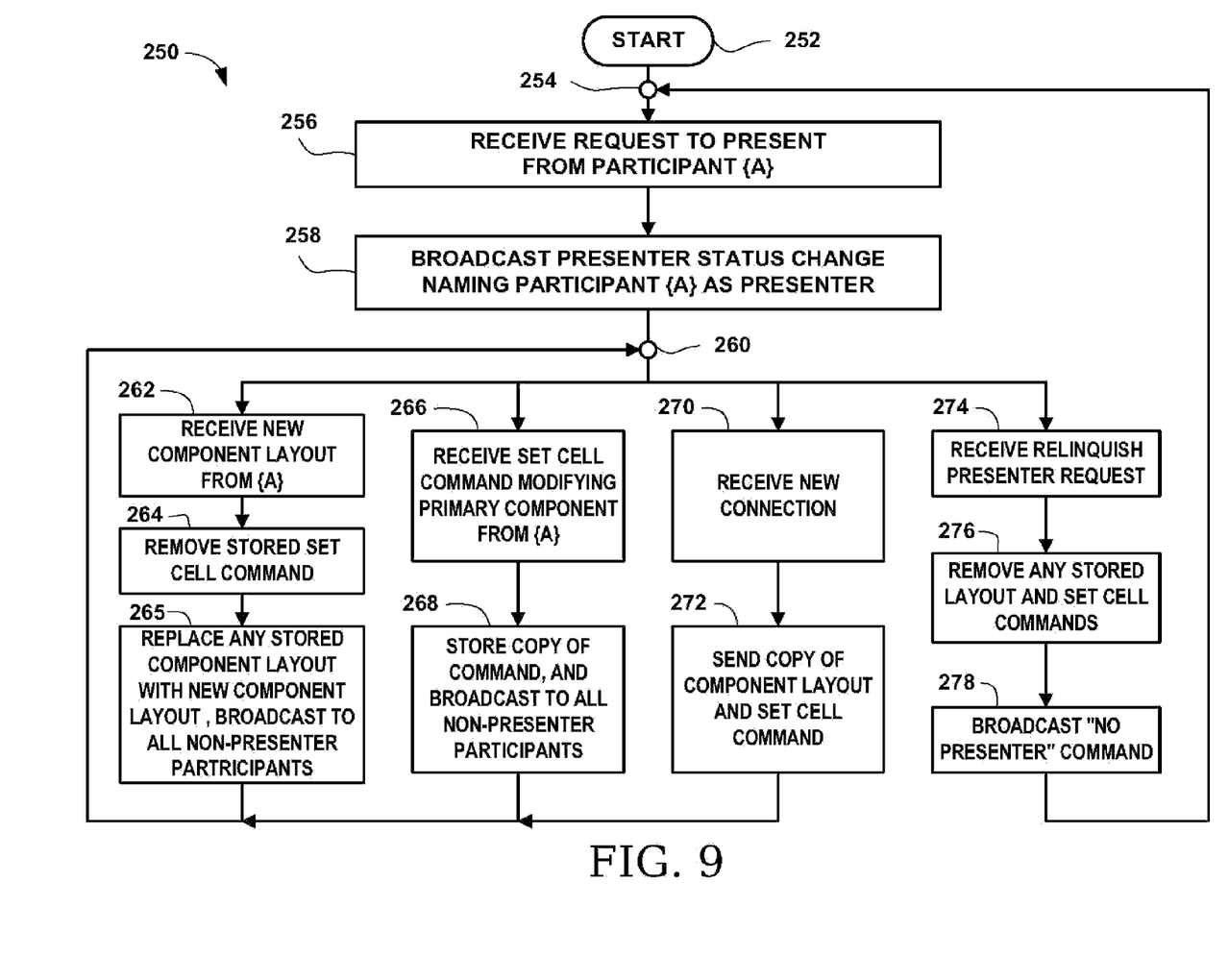
FIG. 9 shows a flowchart representing an exemplary procedure carried out by the server to implement a partial layout synchronization.

FIG. 9 shows a flowchart 250 representing an exemplary procedure carried out by the server to implement a partial layout synchronization. The procedure begins as indicated by start block 252 and enters state 254 wherein no participant has yet been designated a presenter. In one embodiment, the owner or creator of the conference, or person designated by the owner or creator of the conference, can be automatically designated as the presenter at the start of the conference. In this case, a command is broadcast to all participants naming the owner or designated individual as the presenter and the server enters state 260.

In operation 256, the server receives a request to present from participant {A}, wherein "{A}" is an identifier that identifies one of the participants. In response to receiving this request, the server checks to make sure that {A} has permission to be a presenter and that there is currently no presenter active (not shown). After making this determination, server designates {A} as the current presenter by broadcasting a presenter status change naming participant {A} as the presenter in operation 258. After designating a presenter, the server is in state 260 wherein it waits for communication from a participant.

In operation 262, the server receives a new component layout selection from user {A}. Since a new component layout command overrides any previous set cell command, the server removes any stored set cell command from storage in operation 264. In operation 265, the server stores the new component layout and broadcasts the layout description to all non-presenting participants.

In operation 266, the server receives a set cell command from participant {A}. This command may issue from participant {A} when the presenter participant makes a significant change to {A}'s layout. A significant change is one that is conveyed to non-presenter participants. For example, a significant change could be one that changes the focus of the conference. In response to receiving this command, the server stores a copy of the command, and broadcasts the command to all non-presenting participants in operation 268. The procedure then returns to state 260.

In operation 270, the server receives a new connection. A new connection is received when a participant is added to the conference. In response to receiving a new connection, the server sends a copy of any stored layout and set cell command in operation 272. The layout and set cell commands are transmitted to the user who has joined the conference. After the layout and set cell commands are transmitted, the procedure returns to state 260.

In operation 274, the server receives a request from {A} to relinquish presenter status. In response to receiving a request to relinquish presenter status, the server removes any stored layout and set cell commands from its storage in operation 276, and broadcasts the "no presenter" command to all participants in operation 278. The procedure then returns to state 254 to wait for a new request to present.

It can be seen that by the procedure illustrated in flowchart 250, the conference server sets and frees presenter status, and forwards layout definitions and set cell commands from the designated presenter to the non-presenters to effectuate a partial synchronization of views.

Figure 10:
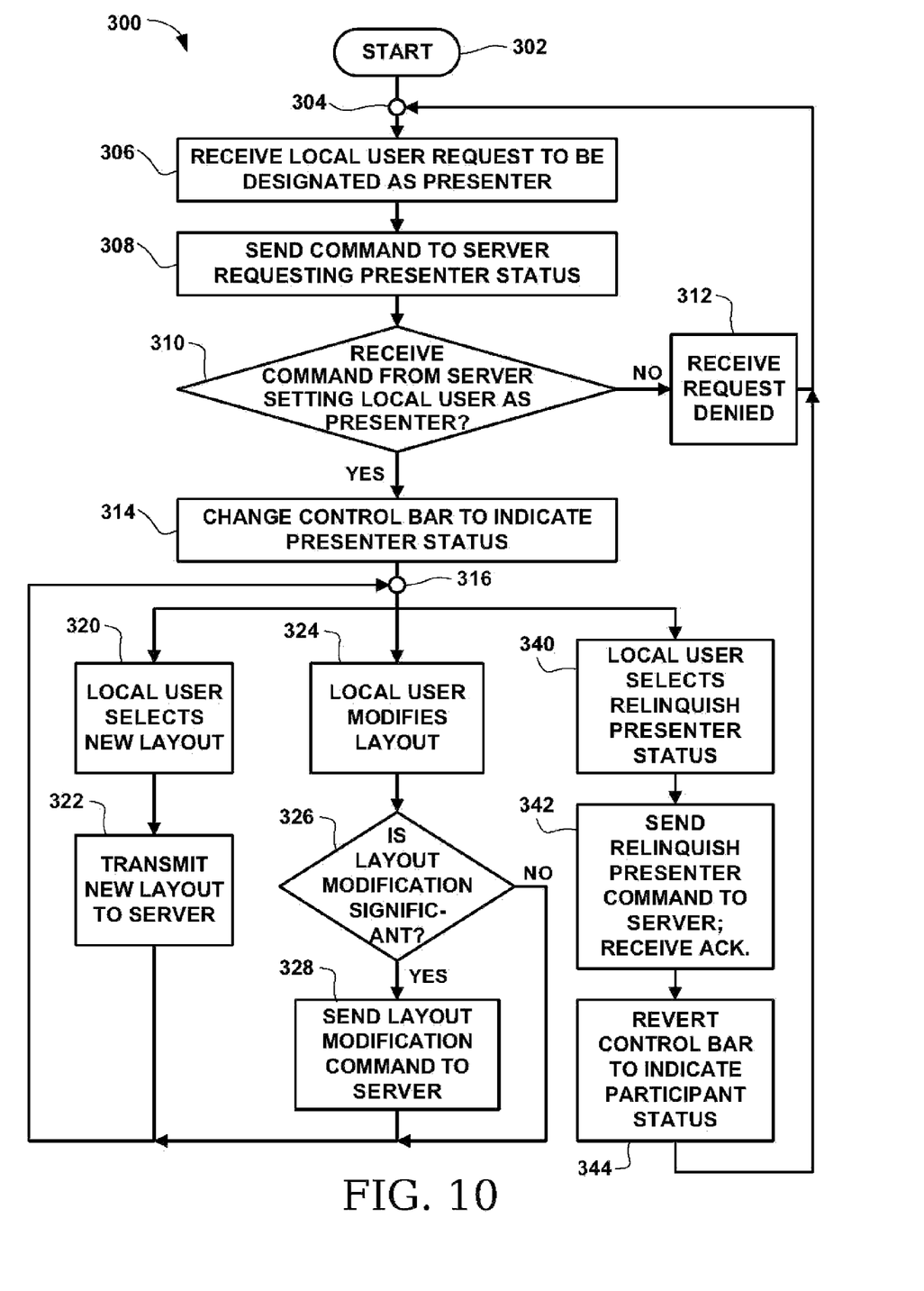
FIG. 10 shows flowchart illustrating an exemplary procedure for a conference client to perform when acting as a presenter participant.

FIG. 10 shows flowchart 300 illustrating an exemplary procedure for a conference client to perform when requesting presenter status, acting as a presenter participant, or relinquishing presenter status. The procedure begins as indicated by start block 302. At the start of the procedure, the conference client is in state 304 wherein the conference client is not designated as the presenter. In operation 306, the conference client accepts a request from the local user to become the presenter for the conference. In response to this request, the conference client transmits a command to the conference server requesting presenter status in operation 308. In one embodiment, this command takes the form of CmdPresenterChangeReq as described above with reference to FIG. 8. In operation 310, it is determined whether the server granted the request or not. If the conference client receives a command from the server setting the local user as the presenter, then the request was granted and the procedure flows to operation 314. However, if the conference client receives a different command form the server, such as a command setting a different user as the presenter, or a command indicating that no user is the presenter, then the request is not granted and the procedure flows to operation 312. In operation 312, for example, a command indicating no presenter is active, such as command 218 in FIG. 8, may be received, indicating that the request was denied. After receiving a denial of a presenter status request, the procedure flows back to state 304.

In operation 314, the conference client enters presenter mode and changes the control bar to provide a graphical indication to the local user that he or she is now a presenter participant, and that changes to the user interface layout may be reflected in other participants' displays. For example, the control bar may be modified as illustrated in FIG. 7B with a "start presenting" button replaced with a "stop presenting" button, and highlights 176 added to layout selection buttons 173 to indicate their change in function, i.e., that they control other participant's displays in addition to the display of the local user. After changing the control bar in operation 314, the conference client is in state 316, which is a state that corresponds to being in a presenter mode.

In operation 320, the conference client accepts a layout selection from the local user when in state 316. For example, the user may select a layout selection button 173 of control bar 170 as described above with reference to FIGS. 7A-7C. In response to the layout selection, the layout is changed to correspond to the local user's selection, and a representation of the selected layout is transmitted to the server as a command in operation 322. The command is thereafter processed by the server as described above with reference to FIG. 9.

In operation 324, the conference client detects that the local user has modified the layout. The modification can include any change in the arrangement of the conference components in the user interface. For example, a layout modification can include removing a component, adding a component, swapping the positions and sizes of two components, and resizing or relocating a component or group of components. When the conference client detects a layout modification, the procedure flows to operation 326.

In operation 326, the conference client determines whether the layout modification is a significant layout modification. A significant modification is one that is conveyed to non-presenter participants for partial synchronization. In general, significant modifications will be ones that suggest a change in the focus of the meeting, e.g., from a whiteboard to a shared application. In one embodiment, changes that result in a new component becoming the primary component are identified as significant. Thus, in one example, the local user swaps the primary component with a secondary component, thereby causing the secondary component to become the new primary component. In this situation, conference client detects a new primary component and identifies that a significant change in the layout has occurred. In response to this, the conference client sends a layout modification command (also referred to herein as a set cell command) to the server in operation 328. The server processes the layout modification command as described above with reference to FIG. 9 by passing a copy to the non-presenting clients so that the new primary component can become the focus of the meeting in other non-presenter participants' displays without affecting their layout in any other way.

If, in operation 326, the conference client determines that the local user made an insignificant change to the layout, then the conference client returns to state 316. An insignificant modification can be characterized as one that is not conveyed to non-presenter participants. For example, if the local user simply brought up a component listing participants and shared documents, e.g., participants component 162 as illustrated in FIG. 3, or if the local user swapped two secondary components or closed a secondary component, or relocated and/or resized some components without changing the primary component, then no further action is necessary and the conference client returns to state 316.

In operation 340, the conference client accepts a request from the local user to relinquish presenter status. This can occur, for example, when the local user selects the "stop presenting" button 175 in control bar 170B as shown in FIG. 7B. Upon receiving this request from the user, the conference client sends a command to the server in operation 342 to relinquishing presenter status. The server returns a command with an acknowledgement. Then, in operation 344, the conference client enters the no-participant mode and reverts the control bar to indicate that no participant has presenter status, e.g., as shown in FIG. 7A.

Figure 11:
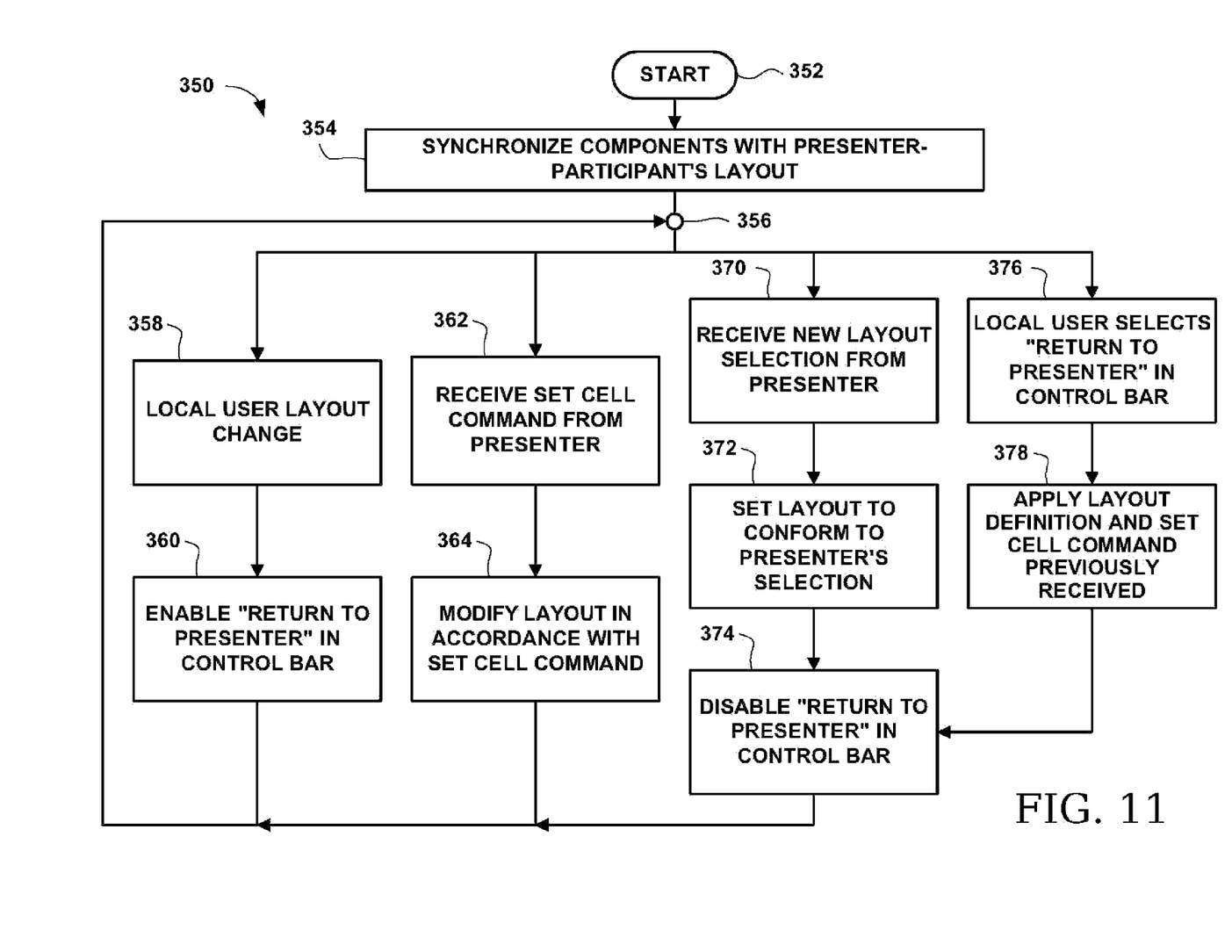
FIG. 11 shows a flowchart depicting an exemplary procedure for a non-presenter client to perform during the course of a conference.

FIG. 11 shows a flowchart 350 depicting an exemplary procedure for a non-presenter client to perform during the course of a conference. The procedure begins as indicated by start block 352 and flows to operation 354 wherein the conference client synchronizes the component layout with the presenter participant. This can occur, for example, when a presenter participant (other than the local user) is designated, or if the local user joins a conference that already has a presenter participant. In either case, the local client will receive a representation of the presenter participant's layout, e.g., a string representation as described above with reference to FIGS. 4-6, and the local client configures the various components in accordance with that representation. In addition, if any layout modifications e.g., CmdSetWorkspaceCell commands, are stored by the conference server, then they are also received and applied to the layout. It should be noted that the synchronization may be a partial synchronization, since the presenter may have made insignificant layout modifications that were not transmitted to the server, and are therefore not available to the non-presenter clients.

After the components are configured, the procedure enters state 356 in which the conference client enters non-presenter mode and waits for an action by the local user or communication from the server affecting the layout. In addition, the control bar 170 has the "start presenting" button 172 replaced with the "return to presenter" button 178 as shown in FIG. 7C, with the "return to presenter" button disabled (e.g., dimmed) so as to indicate that the current layout matches the presenter's layout. It should therefore be clear that, at state 356, another user is the presenter, and the local user is a non-presenter.

In operation 358, the conference client notices that the local user has modified the layout, e.g., by swapping any two components, closing or opening components, resizing or relocating components, etc. In response to detecting a layout modification by the local user, the procedure flows to operation 360 wherein the conference client enables the "return to presenter" button 178 (FIG. 7C) on control bar 170. If the "return to presenter" button is already enabled, then no action is taken. After operation 360, the conference client returns to state 356.

In operation 362, a set cell command is received from the server. As mentioned previously, e.g., with reference to FIG. 8, a set cell command is forwarded to non-presenting participants when the presenter makes a significant modification to the layout. A significant modification is one that is forwarded to non-presenting participants. When a set cell command is received in operation 362, the procedure flows to operation 364 wherein the local layout is partially modified in accordance with the set cell command, thereby causing the local user's attention to be shifted to a media selected by the presenter participant. Components not directly affected by the set cell command remain unchanged thereby avoiding any unnecessary disturbance of the non-presenter participant's layout, as the non-presenter participant may be temporarily focused on other activities, such as a document to be shared with the group or a chat with another conference participant, etc.

In operation 370, a new presenter layout selection is received from the server. A layout selection includes a representation of the presenter's newly selected layout. In response to receiving a layout representation, the conference client, in operation 372, sets the local layout to conform to the presenter's selected layout configuration. The display then changes to conform to this new component layout. Then, in operation 374, the "return to presenter" button 178 in toolbar 170 is disabled, thereby indicating that the current layout configuration matches the presenter's layout. The conference client then returns to state 356.

In operation 376, the conference client accepts a command from the local user to return to the presenter's layout. For example, the user may have clicked the "return to presenter" button 178 in control bar 170 (FIG. 7C). In response to accepting this command from the local user, the conference client, in operation 378, applies the previously received layout and set cell commands to the current layout. The procedure then flows to operation 374 wherein the "return to presenter" button 178 in control bar 170 (FIG. 7C) is disabled, e.g., dimmed. Then, the conference client returns to state 356.

With the above embodiments in mind, it should be understood that the invention can employ various computer-implemented operations involving data stored in computer systems. These operations are those requiring physical manipulation of physical quantities. Usually, though not necessarily, these quantities take the form of electrical or magnetic signals capable of being stored, transferred, combined, compared and otherwise manipulated. Further, the manipulations performed are often referred to in terms such as producing, identifying, determining, or comparing.

Any of the operations described herein that form part of the invention are useful machine operations. The invention also relates to a device or an apparatus for performing these operations. The apparatus can be specially constructed for the required purpose, or the apparatus can be a general-purpose computer selectively activated or configured by a computer program stored in the computer. In particular, various general-purpose machines can be used with computer programs written in accordance with the teachings herein, or it may be more convenient to construct a more specialized apparatus to perform the required operations.

The invention can also be embodied as computer readable code on a computer readable medium. The computer readable medium is any data storage device that can store data, which can be thereafter be read by a computer system. The computer readable medium also includes an electromagnetic carrier wave in which the computer code is embodied. Examples of the computer readable medium include hard drives, network attached storage (NAS), read-only memory, random-access memory, CD-ROMs, CD-Rs, CD-RWs, magnetic tapes and other optical and non-optical data storage devices. The computer readable medium can also be distributed over a network-coupled computer system so that the computer readable code is stored and executed in a distributed fashion.

Embodiments of the present invention can be processed on a single computer, or using multiple computers or computer components which are interconnected. A computer, as used herein, shall include a standalone computer system having its own processor(s), its own memory, and its own storage, or a distributed computing system, which provides computer resources to a networked terminal. In some distributed computing systems, users of a computer system may actually be accessing component parts that are shared among a number of users. The users can therefore access a virtual computer over a network, which will appear to the user as a single computer customized and dedicated for a single user.

Although the foregoing invention has been described in some detail for purposes of clarity of understanding, it will be apparent that certain changes and modifications may be practiced within the scope of the appended claims. Accordingly, the present embodiments are to be considered as illustrative and not restrictive, and the invention is not to be limited to the details given herein, but may be modified within the scope and equivalents of the appended claims.

What is claimed is:

1. A method for enabling, in a teleconferencing system, partial layout synchronization between a user interface layout of a first conference client and a user interface layout of a second conference client, the method comprising:
   entering a presenter mode in a conference client application running on the first conference client;
   receiving a layout modification from a local user of the conference client application, the layout modification altering a selection or arrangement of conference components in a user interface;
   identifying a primary conference component prior to the layout modification and a primary conference component after the layout modification, and determining that the layout modification is a significant layout modification when the primary conference component prior to the layout modification is different from the primary conference component after the layout modification, and determining that the layout modification is an insignificant layout modification when the primary conference component prior to the layout modification is the same as the primary conference component after the layout modification wherein the layout modification comprises at least one of an addition of a conference component to the user interface, a removal of a conference component from the user interface, a swap of two conference components so that each of the two conference components take a size and position of another of the two conference components in the user interface, or a relocating or resizing of one or more conference components in the user interface; and
   transmitting a command for receipt by a conference server only when the layout modification is a significant layout modification, the command containing a representation of the layout modification usable by the second conference client in the non-presenter mode to implement the layout modification in a user interface provided by the second conference client.

2. The method of claim 1, wherein the primary conference component is identified as a conference component taking up more space in the user interface than any other conference component.

3. The method of claim 1, wherein the primary conference component is identified based on its position in the layout of the user interface.

4. The method of claim 1, wherein the primary conference component is identified based on an operational mode or view provided by the conference client.

5. The method of claim 1, further comprising:
   receiving a new layout selection from the local user, the layout selection being a predefined user interface layout or a custom-defined user interface layout, and
   transmitting a representation of the layout selection to the conference server.

6. The method of claim 5, wherein the new layout selection is accepted by detecting that the local user has interacted with a layout selection button in a control bar.

7. The method of claim 6, wherein the control bar contains a graphical indication that the local user is a presenter-participant.

8. The method of claim 5, wherein the representation of the layout selection is contained in a string, the string defining a cell for each displayed component, each cell being defined in the string as a left, right, top, or bottom portion of a larger region in which the cell is contained, the cell occupying a defined fraction of space of the larger region, the layout selection defining a layout of two or more cells.

9. A teleconferencing system enabling partial layout synchronization between a user interface layout of a first conference client and a user interface layout of a second conference client, the system comprising:

a conference server comprising a general purpose computer system;

a plurality of conference clients including the first and second conference clients, each conference client being in communication with the conference server over a network connection, the conference server effectuating communication between and among the plurality of conference clients;

the conference server being configured to designate one conference participant attending a teleconference using the teleconferencing system as a presenter-participant, the presenter-participant being a local user of the first conference client of the plurality of conference clients, the first conference client being configured to enter a presenter mode in response to the designation;

the first conference client being further configured to accept a layout modification from the local user, the layout modification altering a selection or arrangement of conference components in a user interface; and the first conference client, when in the presenter mode, being further configured to identify a primary conference component prior to the layout modification and a primary conference component after the layout modification, and determine that the layout modification is a significant layout modification when the primary conference component prior to the layout modification is different from the primary conference component after the layout modification, and determine that the layout modification is an insignificant layout modification when the primary conference component prior to the layout modification is the same as the primary conference component after the layout modification, wherein the layout modification comprises at least one of an addition of a conference component to the user interface, a removal of a conference component from the user interface, a swap of two conference components so that each of the two conference components take a size and position of another of the two conference components in the user interface, or a relocating or resizing of one or more conference components in the user interface; and transmit a command to the conference server only when the layout modification is a significant layout modification, the command containing a representation of the layout modification usable by an other of the plurality of conference clients to implement the layout modification in a user interface provided by the other of the plurality of conference clients, the conference server being configured to broadcast the command to the other of the plurality of conference clients.

10. The system of claim 9, wherein the first conference client is configured to identify the primary conference component by identifying a conference component that takes up more space in the user interface than any other conference component.

11. The system of claim 9, wherein the first conference client is configured to identify the primary conference component based on its position in the layout of the user interface.

12. The method of claim 9, wherein the first conference client is configured to identify the primary conference component based on an operational mode or view provided by the first conference client.

13. The system of claim 9, wherein the first conference client is further configured to accept a new layout selection of a predefined user interface layout from the local user and transmit a representation of the layout selection to the conference server.

14. The system of claim 13, wherein the first conference client is configured to detect the new layout selection by detecting that the local user has interacted with a layout selection button in a control bar.

15. The system of claim 14, wherein the control bar contains a graphical indication that the local user is a presenter-participant.

16. The system of claim 13, wherein the representation of the layout selection is contained in a string, the string defining a cell for each displayed component, each cell being defined in the string as a left, right, top, or bottom portion of a larger region in which the cell is contained, the cell occupying a defined fraction of space of the larger region.

* * * * *